United States Patent
Barr et al.

[19]

[11] Patent Number: 6,134,089
[45] Date of Patent: Oct. 17, 2000

[54] CURRENT PERPENDICULAR TO PLANE MAGNETORESISTIVE DEVICE WITH LOW RESISTANCE LEAD

[75] Inventors: Ronald A. Barr, Mountain View; Bill W. Crue, San Jose; Ming Zhao, Fremont, all of Calif.

[73] Assignee: Read-Rite Corporation, Fremont, Calif.

[21] Appl. No.: 09/266,678

[22] Filed: Mar. 11, 1999

[51] Int. Cl.[7] ....................................................... G11B 5/39
[52] U.S. Cl. ........................ 360/322; 360/319; 360/324; 360/324.2
[58] Field of Search .................... 360/113, 312, 360/322, 324, 324.2

[56] References Cited

U.S. PATENT DOCUMENTS

| | | | |
|---|---|---|---|
| 5,446,613 | 8/1995 | Rottmayer | 360/113 |
| 5,627,704 | 5/1997 | Lederman et al. | 360/113 |
| 5,668,688 | 9/1997 | Dykes et al. | 360/113 |
| 5,731,937 | 3/1998 | Yuan | 360/113 |
| 5,809,636 | 9/1998 | Shouji et al. | 29/603.14 |
| 5,966,012 | 10/1999 | Parkin | 324/252 |

OTHER PUBLICATIONS

Rottmayer, Robert, Zhu, Jian–Gang, "A New Design For An Ultra–High Density Magnetic Recording Head Using A GMR Sensor In The CCP Mode," *IEEE Transactions on Magnetics*, vol. 31, No. 6, Nov. 1995, pp. 2597–2599.

*Primary Examiner*—Jefferson Evans
*Attorney, Agent, or Firm*—Michaelson & Wallace

[57] ABSTRACT

The present invention provides a thin film magnetoresistive current perpendicular to the plane read head device and method of fabrication. The structure of the thin film head of the present invention may comprise a lower pedestal shield, a lower sensor lead, a magnetoresistive structure, an upper sensor lead, and an upper pedestal shield. The sensor leads have a portion located between the pedestal and the magnetoresistive structure, and a portion lateral to the between portion. Either or both sensor leads may have a portion projecting from the lateral portion. The projecting portions provide greater cross-section to the lateral portion of the lead to decrease lead resistance without increasing the pedestal-to-pedestal distance. The projecting portions form recessed portions in the sensor leads for seating the pedestal. The projecting portions may abut the pedestals. The upper sensor lead may also have a portion projecting downward from its lateral portion to form a recessed portion for seating the magnetoresistive structure. The magnetoresistive structure may utilize giant magnetoresistive materials, and may employ any known structure, such as multilayer, spin valve, or other known types of magnetoresistive materials and structures. The present invention provides lower resistance sensor leads without increasing the distance between shield pedestals, thus allowing for high data density while improving the magnetoresistive effect.

22 Claims, 3 Drawing Sheets

CURRENT PERPENDICULAR TO PLANE MAGNETORESISTIVE DEVICE WITH LOW RESISTANCE LEAD

BACKGROUND OF THE INVENTION

Data is stored on magnetic media by writing on the magnetic media using a write head. Magnetic media can be formed in any number of ways, such as tape, floppy diskette, hard disk, or the like. Writing involves storing a data bit by utilizing magnetic flux to set the magnetic moment of a particular area on the magnetic media. The state of the magnetic moment is later read, using a read head, to retrieve the stored information.

Conventional thin film read heads employ magnetoresistive material, generally formed in a layered structure of magnetoresistive and non-magnetoresistive materials, to detect the magnetic moment of the bit on the media. Shields commonly are formed on either side of the magnetoresistive structure to inhibit the magnetic flux of adjacent bits from being detected by the magnetoresistive structure. The shields are located close to the magnetoresistive materials to allow for more closely space bits on the media.

A sensing current is passed through the magnetoresistive material to detect changes in the resistance of the material induced by the bits as the media is moved with respect to the read head. The magnetoresistive effect, given by $\Delta R/R$, typically is detected by passing a sensing current through the sensor along the plane of the layers.

One problem with devices having this structure, particularly in giant magnetoresistive devices, is that because the sensing current is allowed to flow through the layers in parallel, shunt current passes through layers of non-magnetoresistive. The shunt current, reduces the magnetoresistive effect of the sensor.

As an alternative to this structure, the leads may be arranged so that the sensing current passes through the sensor perpendicular to the plane of the layers. By passing the sensing current perpendicular to the plane, shunt current through the non-magnetic layers can be eliminated.

Current perpendicular to the plane devices or CPP devices, while overcoming some problems associated with the current in the plane or CIP devices, have other design problems. For example, U.S. Patent entitled MAGNETORESISTIVE TRANSDUCER WITH FOUR-LEAD CONTACT, by David Richardson, et al., S/N 09/006,307, filed on Jan. 13, 1998, issued as U.S. Pat. No. 5,959,811 on Sep. 28, 1999, herein incorporated by reference in its entirety, describes problems associated with providing electrical contacts to the magnetoresistive sensors. With CPP devices, because the thin film layers have such a low resistance perpendicular to their plane, the resistance of the sensing leads significantly reduces the magnetoresistive effect of the device.

BRIEF SUMMARY OF THE INVENTION

The present invention provides a thin film magnetoresistive read head having low resistance sensor leads without increasing the distance between shield pedestals. The structure of the thin film head of the present invention may comprise a lower pedestal shield, a lower sensor lead, a magnetoresistive structure, an upper sensor lead, and an upper pedestal shield. Current may be supplied across the magnetoresistive structure perpendicular to the plane of its layers via the pedestals. A voltage sensor may be coupled to the sensor leads to detect change in the resistance of the magnetoresistive structure.

The sensor leads have a portion located between the pedestal and the magnetoresistive structure and a portion lateral to the between portion. The lower sensor lead, the upper sensor lead, or both the upper and the lower sensor leads have a portion projecting from the lateral portion. The projecting portion provides greater cross-section to the lateral portion of the lead to decrease lead resistance as seen by the voltage sensor without increasing the pedestal-to-pedestal distance.

The upper sensor lead may have portions projecting upward from lateral portions on either side of its between portion forming a recess in the upper sensor lead for seating the upper pedestal. The lower sensor lead may have portions projecting downward from lateral portion on either side of its between portion forming a recessed portion in the lower sensor for seating the lower pedestal within. The upward and downward projecting portions of the upper and lower sensor leads may abut the pedestals. The upper sensor lead may also have a portion projecting downward from its lateral portion.

The magnetoresistive structure of the thin film head of the present invention may utilize giant magnetoresistive materials, or other known magnetoresistive materials, and may employ any known structure, such as multilayer, spin valve, spin dependent tunneling, or other known types of structures.

The present invention provides lower resistance sensor leads without increasing the distance between shield pedestals, thus allowing for high data density while improving the magnetoresistive effect.

The read head of the present invention may be utilized to provide an improved data storage and retrieval apparatus.

DETAILED DESCRIPTION OF THE PREFERRED EMBODIMENTS OF THE INVENTION

Figure 1:
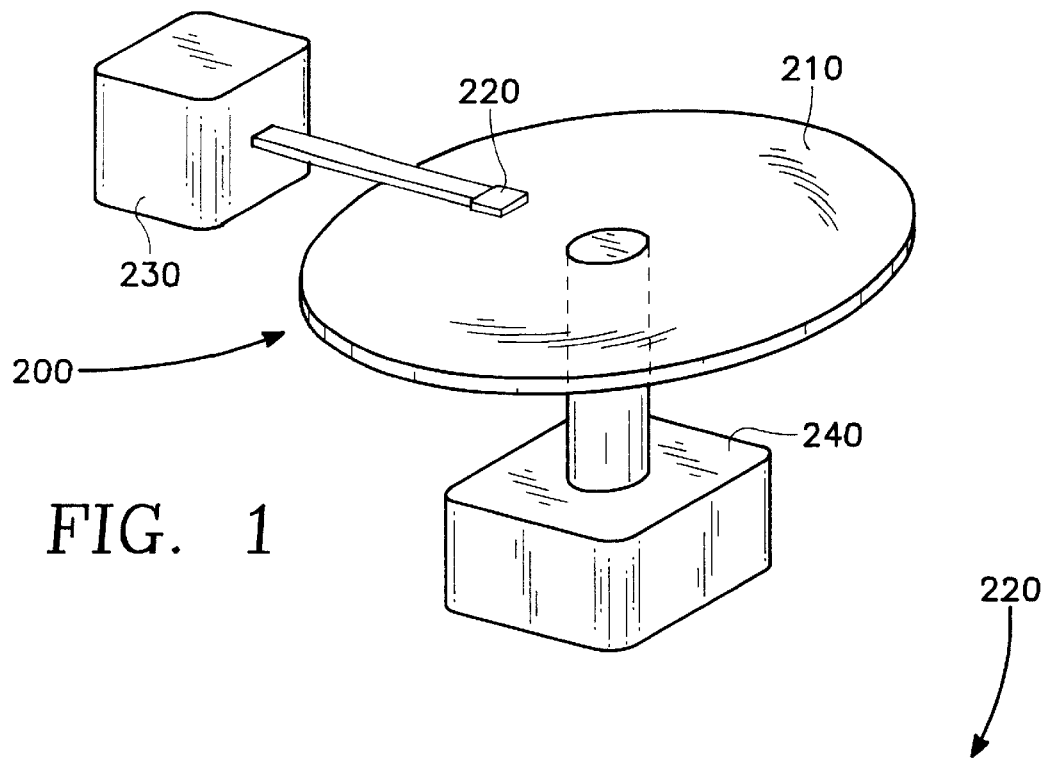
FIG. 1 is illustrates a disk type magnetic data storage and retrieval apparatus.

FIG. 1 shows the improved read head of the present invention embodied in a disk type magnetic data storage and retrieval apparatus 200. The improved spin valve of the present invention may be located within a merged head assembly 220 which rides above a magnetic storage media 210, depicted in FIG. 1 as a rotatable hard disk type storage media. The hard disk is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Figure 2:
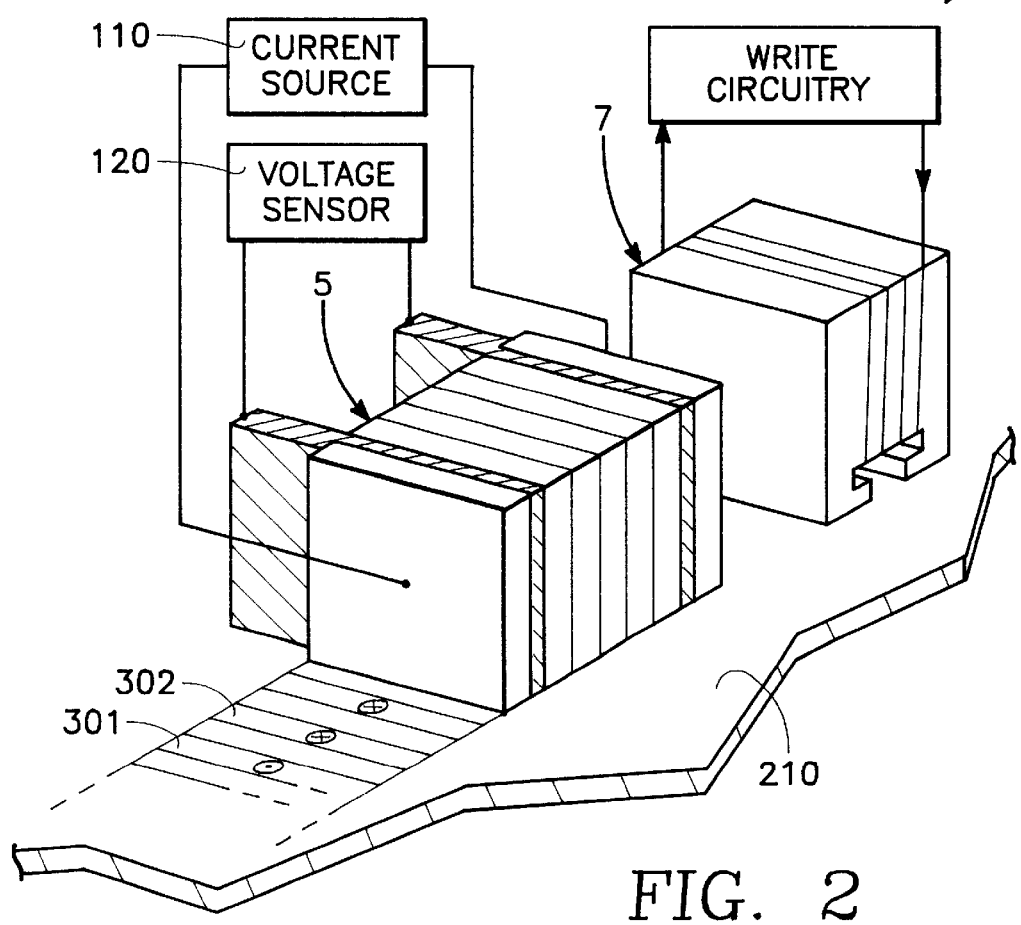
FIG. 2 is a simplified functional illustration of a head assembly shown in exploded perspective view.

FIG. 2 shows a simplified functional illustration of the head assembly 220. Merged head assemblies 220 are formed having a write head 7, used to write or set the magnetization of bits 301, 302 on the media 210, while a read head 5, reads the magnetization of those bits 301, 302 from the media 210. The depiction in FIG. 2 is a functional representation of a merged head, the merged head of the present invention may be formed by techniques well know in the art, such as by masking, depositing, and etching successive layers to form the well known structures of the merged head 220.

Figure 3:
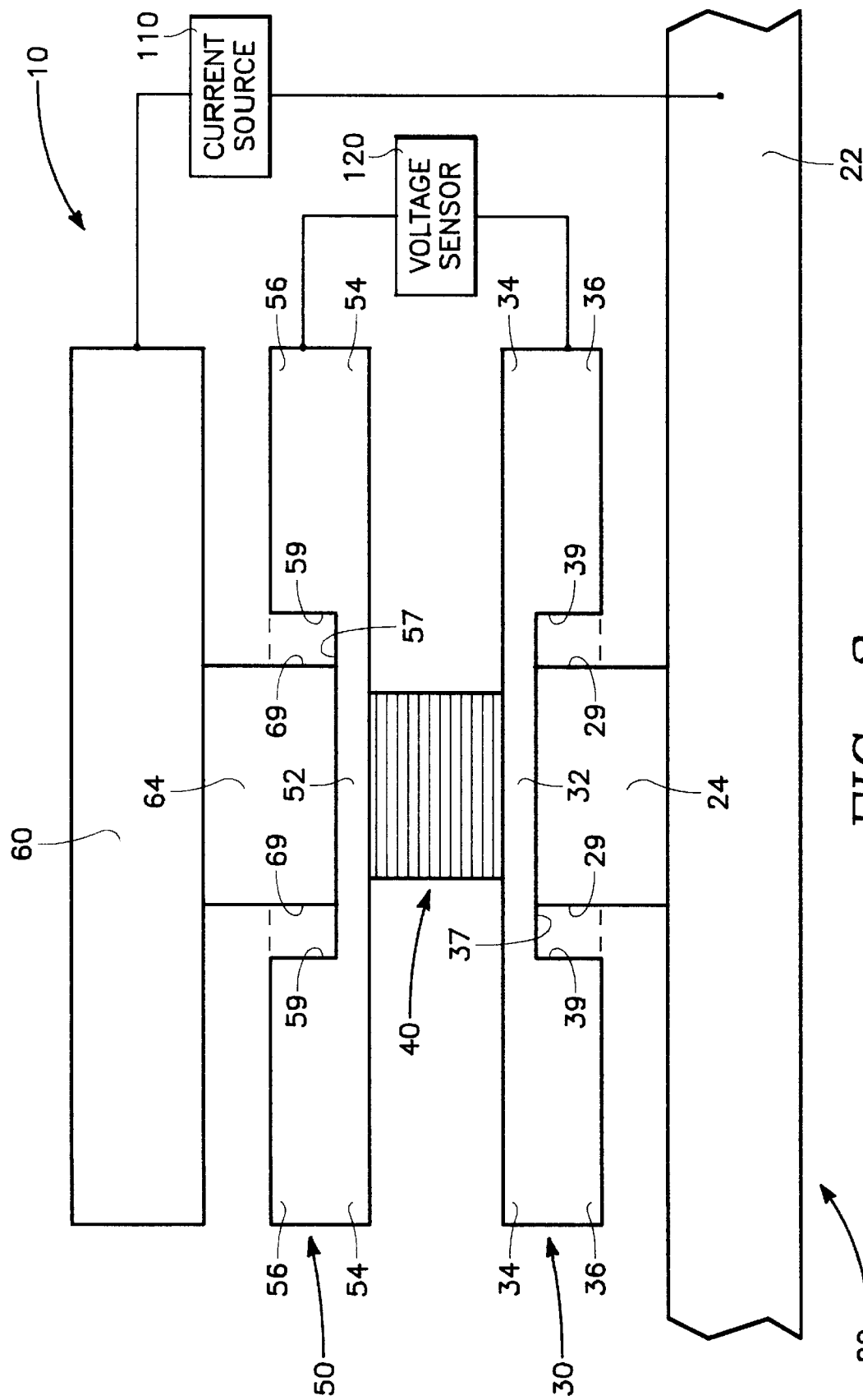
FIG. 3 is a cross sectional view of a preferred embodiment of the thin film read head in accordance with the present invention.

Turning to FIG. 3, the present invention utilizes an improved thin film head 10. The structure of the thin film head 10 of the present invention may comprise: a lower shield 20, a lower sensor lead 30, a magnetoresistive structure 40, an upper sensor lead 50, and an upper shield 60. The upper and lower shields 60 & 20 may comprise pedestal portions 64 & 24 respectively.

The upper and lower shields 60 & 20 are used to prevent stray magnetic flux from being detected by the magnetoresistive structure 40. The upper and lower shields 60 & 20, typically are formed with pedestals 64 & 24, respectively. The upper and lower shields 60 & 20 may be formed of NiFe or other magnetic material as is known in the art.

The upper and lower shields 60 & 20 prevent magnetic flux from adjacent bits on the media from being detected by the magnetoresistive structure 40. This allows closer placement of the bits on the media, which improves data density. Furthermore, the distance between the shields determines, in part, the data density on the media. Closer placement of the shields 60 & 20 with respect to the magnetoresistive structure 40 allows closer placement of neighboring bits on the media so as to improve the linear density of the bits.

In the embodiment of FIG. 3, a current source 110 is coupled to the shields to provide current across the magnetoresistive structure 40 perpendicular to the plane of the layers. A voltage sensor 120 is coupled to the upper and lower sensor leads 50 & 30 to detect the changes in voltage across the magnetoresistive structure 40 as its resistance changes in response to magnetic flux from the media.

As such, the sensor leads 50 & 30 are part of the resistance measured by the voltage sensor 120. Therefore, the resistance of the sensor leads must be minimized to optimize the measurement of the magnetoresistive effect ΔR/R. This is particularly important in current perpendicular to the plane giant magnetoresistive or CPP GMR devices. As such, the upper and lower sensor leads may be formed of gold, silver, copper, aluminum, or other low resistance material.

The upper and lower sensor leads 50 & 30 are located between the magnetoresistive structure 40 and the respective upper or lower pedestals 64 & 24. The upper and lower sensor leads 50 & 30 have portions 52 & 32 between the magnetoresistive structure 40 and the respective upper or lower pedestals 64 & 24, and portions 54 & 34, respectively, extending laterally from the between portions 52 & 32.

To reduce the resistance of the upper and lower sensor leads 50 & 30, the embodiment of FIG. 3 provides portions 56 & 36 projecting upward and downward, respectively. The upper and lower projecting portions 56 & 36 may abut the pedestals 64 & 24 as shown in phantom.

The upward projecting portions 56 define a recess 57 in the upper sensor lead 54 positioned above the between portion 52. Likewise, the lower projecting portions 36 form a recess 37 in the lower sensor lead 30 positioned below the between portion 32. The pedestals 64 & 24 of the upper and lower shields 60 & 20 are located within the recesses 57 & 37. As the projecting portions 56 & 36 may abut the pedestals 64 & 24, the walls 59 & 39 of the recesses 57 & 37 may be in contact with the walls 69 & 29 of the pedestals 64 and 24, respectively.

The upper projecting portions 56 of the upper sensor lead 50 may be formed by depositing lead material onto the lateral portion 34 of the upper sensor lead 50. The upward projecting portions 56 of the upper sensor lead 50 may be deposited on the lateral portions 54 of the after they are planarized in preparation for forming the upper pedestal 64 and may be deposited after the upper pedestal 64 is formed.

The lower projecting portions 36 of the lower sensor lead 30 may be formed by insetting lead material into the dielectric region normally located below the lateral portion 34 of the lower sensor lead 30. The downward projecting portions may be deposited after the lower pedestal 24 is formed. The downward projecting portions 36 of the lower sensor lead 30 may be formed by masking and etching the dielectric, such as Alumina, and depositing conductive sensor lead material. After deposition, the top surface of downward projecting portions may be planarized along with the top surface of the lower pedestal 24 in preparation for deposition of a lower sensor lead layer used to form the between and lateral portions 32 & 34.

The magnetoresistive structure 40 has a layered structure and may employ giant magnetoresistive structure and materials. The magnetoresistive structure 40 may be: a multilayer giant magnetoresistive device; a spin dependent tunneling device; a spin valve type device as disclosed in U.S. Pat. No. 5,668,688, by Dykes et al., entitled CURRENT PERPENDICULAR-TO-THE-PLANE SPIN VALVE TYPE MAGNETORESISTIVE TRANSDUCER, issued on Sep. 16, 1997, herein incorporated by reference in its entirety; or any other structure well known in the art. The magnetoresistive structure 40 is located between the pedestals 64 and 24 so that current is supplied perpendicular to the plane of the layers of the structure.

Figure 4:
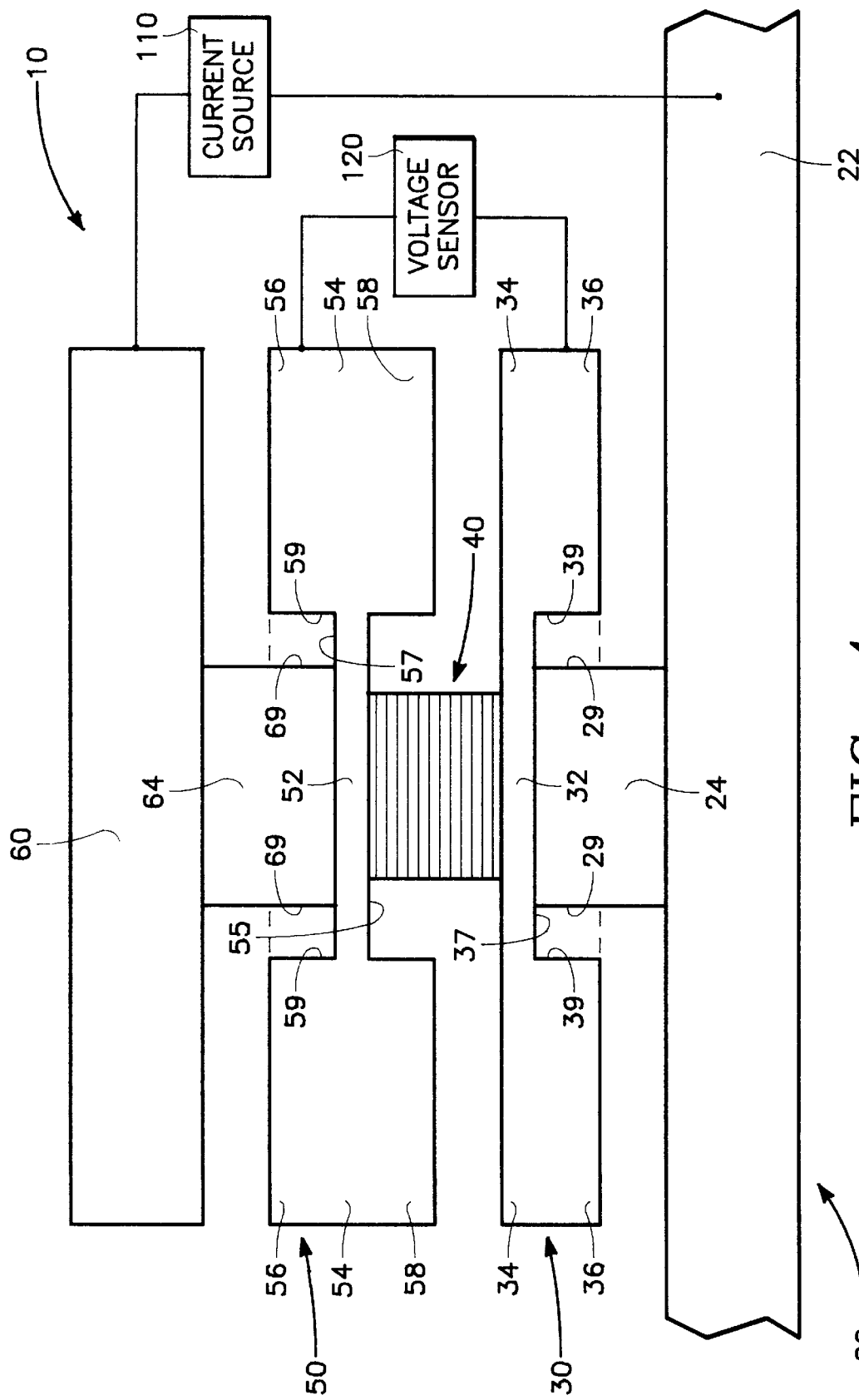
FIG. 4 is a cross sectional view of a preferred embodiment of the thin film read head in accordance with the present invention.

Turning to FIG. 4, in addition to the structures as discussed with reference to FIG. 3, the embodiment of FIG. 4 also has portions projecting down from the lateral portions 54 of the upper sensor lead 50. The downward projecting portions 58 form a recessed portion 55 in the upper sensor 50. The magnetoresistive structure 40 is located within the recess portion 55. The downward projecting portions 58 of the upper sensor lead 50 further reduce the resistance of the upper sensor lead 50 while not increasing the distance between the pedestals 64 & 24.

The downward projecting portions 58 of the upper sensor lead may be formed by masking and etching the dielectric normally located under the upper sensor lead 50. It should be noted that the downward projecting portions 58 should not abut the magnetoresistive structure 40. Furthermore, there must be sufficient dielectric material between the downward projecting portions 58 and the lateral portions 34 of the lower sensor lead 30 to prevent arcing.

The present invention provides the low resistance sensor leads 50 & 30 without increasing the distance between the pedestals 64 & 24 of the upper and lower shields 64 thus allowing for high data density while improving the magnetoresistive effect. Whereas the lead resistance of the structure of FIG. 1 without the projections has about two to three ohms of lead resistance, the measured resistance of the embodiment of FIG. 1 with the projections abutting the pedestals is about one ohm.

While the preferred embodiments of the present invention have been described in detail above, many changes to these embodiments may be made without departing from the true scope and teachings of the present invention. The present invention, therefore, is limited only as claimed below and the equivalents thereof.

What I claim is:

1. A current perpendicular to the plane thin film read head comprising:
   a) a pair of shields;
   b) a magnetoresistive structure;
   c) a pair of sensor leads, each of the pair of sensor leads extending between the magnetoresistive structure and one of the pair of shields; and
   d) at least one of the pair sensor leads comprising a recessed portion, the recessed portion being disposed between the magnetoresistive structure and one of the pair of shields, such that at least one of the MR structure and the one of the pair of shields is disposed at least partially within the recessed portion.

2. The thin film read head of claim 1 wherein at least one of the pair of shields is disposed at least partially within the recessed portion.

3. The thin film read head of claim 2 wherein the at least one of the pair of shields further comprises a pedestal disposed within the recessed portion.

4. The thin film read head of claim 1 wherein each of the pair of sensor leads comprises a recessed portion.

5. The thin film read head of claim 4 wherein each of the pair of shields comprises a pedestal and wherein each of the pedestals are disposed at least partially within a recessed portion in each of the pair of sensor leads.

6. The thin film read head of claim 1 wherein the magnetoresistive structure is disposed at least partially within the recessed portion.

7. The thin film read head of claim 6 wherein each of the pair of shields comprises a pedestal and wherein each of the pedestals are disposed at least partially within a recessed portion in each of the pair of sensor leads.

8. The thin film read head of claim 1 wherein the pair of shields comprises an upper and a lower pedestal, and wherein the pair of sensor leads further comprises an upper and a lower lead, and wherein the upper pedestal is recessed within the upper sensor lead, and wherein the lower pedestal is recessed within the lower sensor lead so as to minimize the distance between each of the pair of shields while minimizing the resistance of the upper and lower sensor leads.

9. The thin film read head of claim 8 wherein the magnetoresistive structure is recessed within the upper sensor lead so as to minimize the distance between each of the pair of shields while minimizing the resistance of the upper and lower sensor leads.

10. The thin film read head of claim 1 wherein the each of the sensor leads comprise the recessed portion; the recessed portion of each of the sensor leads having side walls, and wherein each of the pair of shields comprise pedestals having side walls, and wherein the side walls of the recessed portion of each of the sensor leads abut the side walls of the pedestals recessed therein.

11. The thin film read head of claim 1 wherein the pair of sensors leads are formed with a step structure so as to minimize the distance between each of the pair of shields while minimizing the resistance of the pair of sensor leads.

12. The thin film read head of claim 1 wherein the magnetoresistive structure is a current perpendicular to the plane giant magnetoresistive multilayer structure.

13. A thin film read head comprising:
   a) a pair of shields;
   b) a pair of sensor leads;
   c) a current perpendicular to the plane magnetoresistive structure between the sensor leads;
   d) each of the pair of sensor leads comprising:
      (i) a portion between one of the pair of shields and the magnetoresistive structure; and
      (ii) a portion lateral to the between portion; and
   e) the lateral portions having greater cross-section than the between portions.

14. The thin film read head of claim 13 wherein the pair of sensor leads comprise an upper and a lower sensor lead, and wherein the lateral portion of the lower sensor lead comprises a downward projecting portion.

15. The thin film read head of claim 14 wherein the lateral portion of the upper sensor lead comprises an upward projecting portion.

16. The thin film read head of claim 15 wherein the pair of shields comprises upper and a lower shields, and wherein the upper and lower shields comprise upper and lower pedestals respectively, and wherein the upward projecting portion of the lateral portion of the upper sensor lead and the downward projecting portion of the lateral portion of the lower sensor lead abut the upper pedestal and lower pedestals respectively.

17. The thin film read head of claim 14 wherein the lateral portion of the upper sensor lead comprises a downward projecting portion.

18. The thin film read head of claim 13 wherein the magnetoresistive structure is a current perpendicular to the plane giant magnetoresistive multilayer structure.

19. The thin film read head of claim 13 wherein the pair of sensor leads are formed with a step structure so as to minimize the distance between each of the pair of shields while minimizing the resistance of the pair of sensor leads.

20. A method for forming a current perpendicular to the plane thin film read head comprising:
   a) forming a lower sensor lead layer;
   b) forming an upper sensor lead layer;
   c) forming a magnetoresistive structure between the upper and lower sensor lead layers;
   d) forming at least one of an upward projecting portion of an upper sensor lead or a downward projecting portion of a lower sensor lead; and
   e) forming a shield such that the shield is disposed at least partially within a recess formed by the lower sensor lead or the upward sensor lead.

21. The method of claim 20 wherein forming the downward projecting portion of the lower sensor lead and forming the lower sensor lead layer forms an lower sensor lead with a recessed portion, and further comprising forming the shield as a lower pedestal shield prior to forming the lower sensor layer so that the lower pedestal shield is located within the recessed portion of the lower sensor lead.

22. The method of claim 20 wherein forming the upward projecting portion of the upper sensor lead and forming the upper sensor lead layer forms an upper sensor lead with a recessed portion, and further comprising forming the shield as an upper pedestal shield so that the upper pedestal shield is located within the recessed portion of the upper sensor lead.

* * * * *